United States Patent [19]
Cooper

[11] 4,384,281
[45] May 17, 1983

[54] THEFT DETECTION APPARATUS USING SATURABLE MAGNETIC TARGETS
[75] Inventor: Michael N. Cooper, Flushing, N.Y.
[73] Assignee: Knogo Corporation, Hicksville, N.Y.
[21] Appl. No.: 204,005
[22] Filed: Oct. 31, 1980
[51] Int. Cl.³ .............................................. G08B 13/24
[52] U.S. Cl. .................................. 340/572; 340/505; 343/6.5 SS; 343/748; 343/788; 343/867; 343/894; 343/898; 343/908
[58] Field of Search .............................. 340/572, 505; 343/6.5 R, 6.5 SS, 748, 787, 788, 866, 867, 894, 898, 908

[56] References Cited
U.S. PATENT DOCUMENTS

| 1,394,560 | 10/1921 | Kolster | 343/748 X |
| 2,267,047 | 12/1941 | Schaper | 343/748 |
| 3,534,243 | 10/1970 | Hiromichi et al. | |
| 3,673,437 | 6/1972 | Wright | |
| 3,737,735 | 6/1973 | Benassi | |
| 3,820,103 | 6/1974 | Fearon | 340/572 |
| 3,820,104 | 6/1974 | Fearon | 340/572 |
| 4,074,249 | 2/1978 | Minasy | 340/572 |
| 4,118,693 | 10/1978 | Novikoff | 340/572 |
| 4,243,980 | 1/1981 | Lichtblau | 340/572 |
| 4,251,808 | 2/1981 | Lichtblau | 340/572 |
| 4,260,990 | 4/1981 | Lichtblau | 340/572 X |

FOREIGN PATENT DOCUMENTS 763681  5/1934  France ............................ 340/572

Primary Examiner—John W. Caldwell, Sr.
Assistant Examiner—Joseph E. Nowicki
Attorney, Agent, or Firm—Fitzpatrick, Cella, Harper & Scinto

[57] ABSTRACT

An electronic theft detection apparatus for detection of saturable magnetic targets has transmitter and receiver antennas formed of single turn loops of rigid metal pipe. The antennas are rectangular and have a width, in the direction of passage, through the interrogation zone, less than the length of a shopping cart. The transmitter antenna is in the form of a rectangular loop and the receiver antenna is of the same overall size and configuration but is bisected with a conductor to form two balanced loops. The antennas are purely inductive and a series resonant circuit is inductively coupled into the transmitter antenna and a parallel resonant circuit is inductively coupled out of the receiver antenna. Special circuits are also provided for temporarily disabling the apparatus when a related lower harmonic frequency signal decreases in amplitude.

29 Claims, 9 Drawing Figures

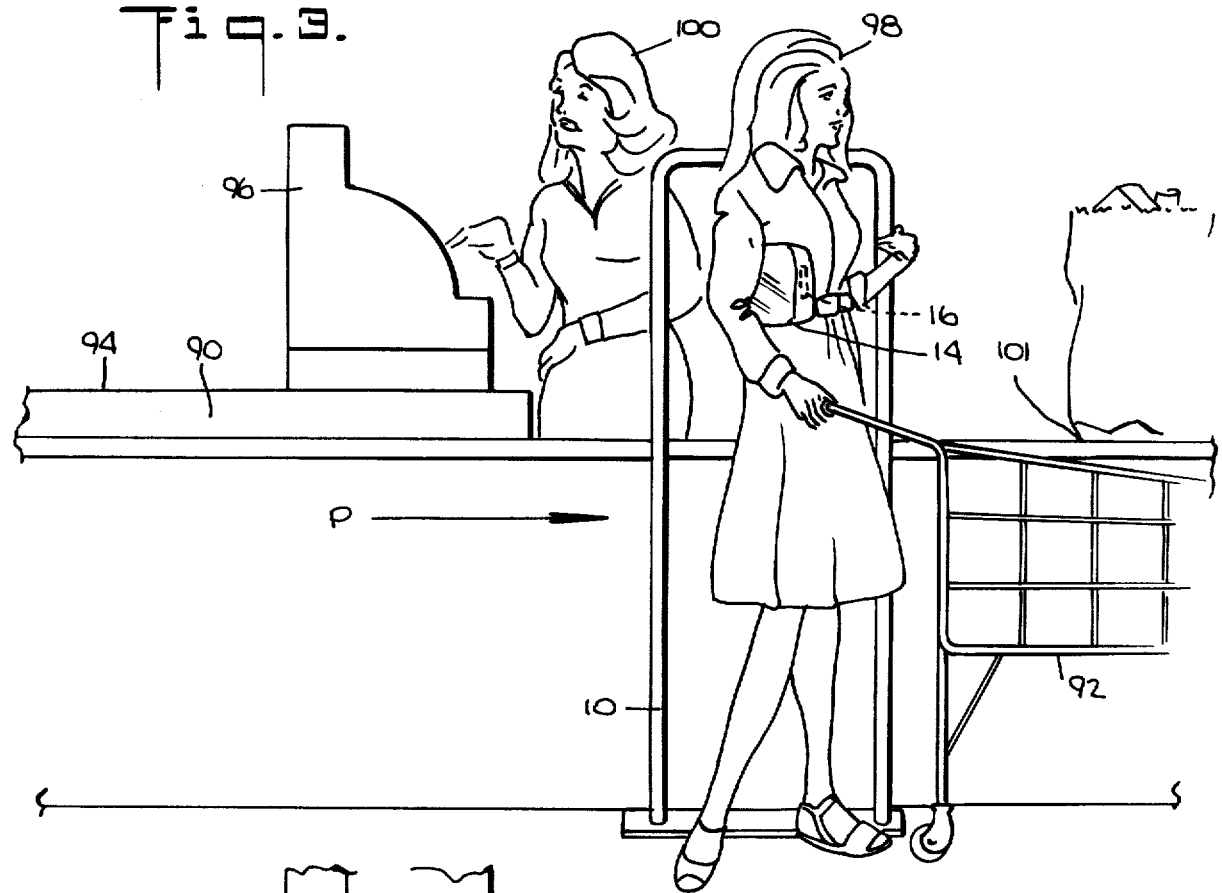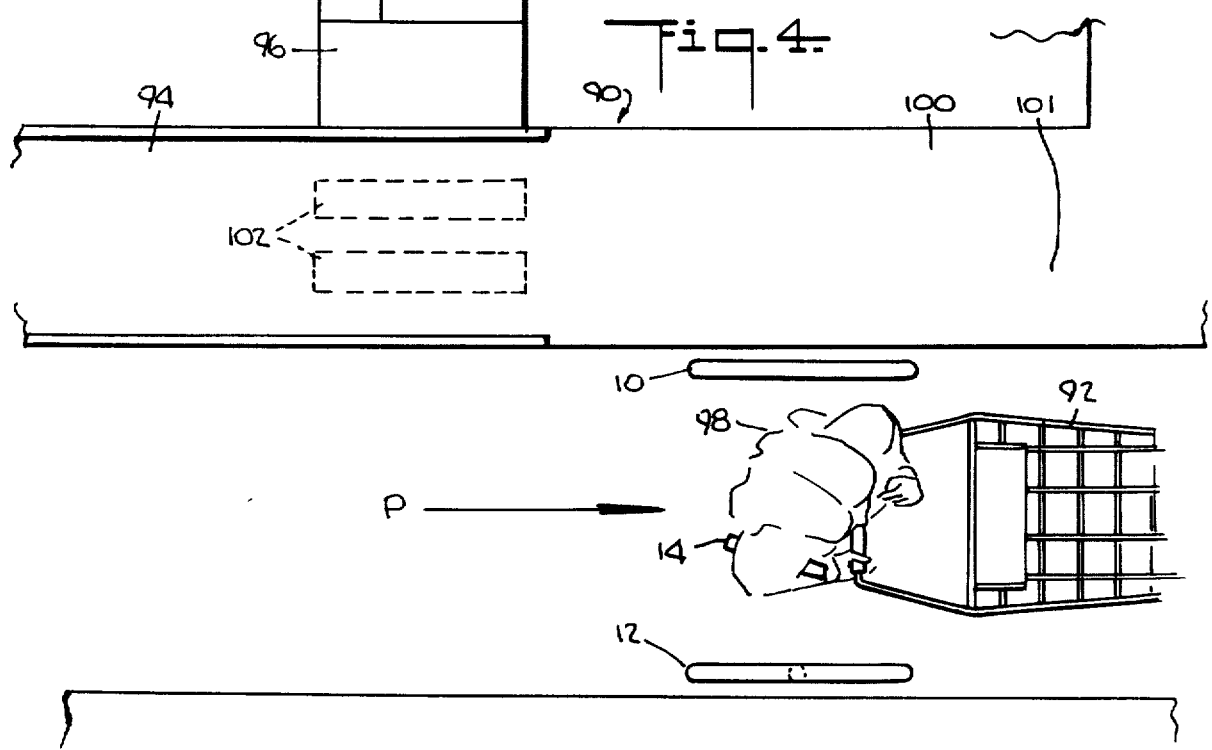

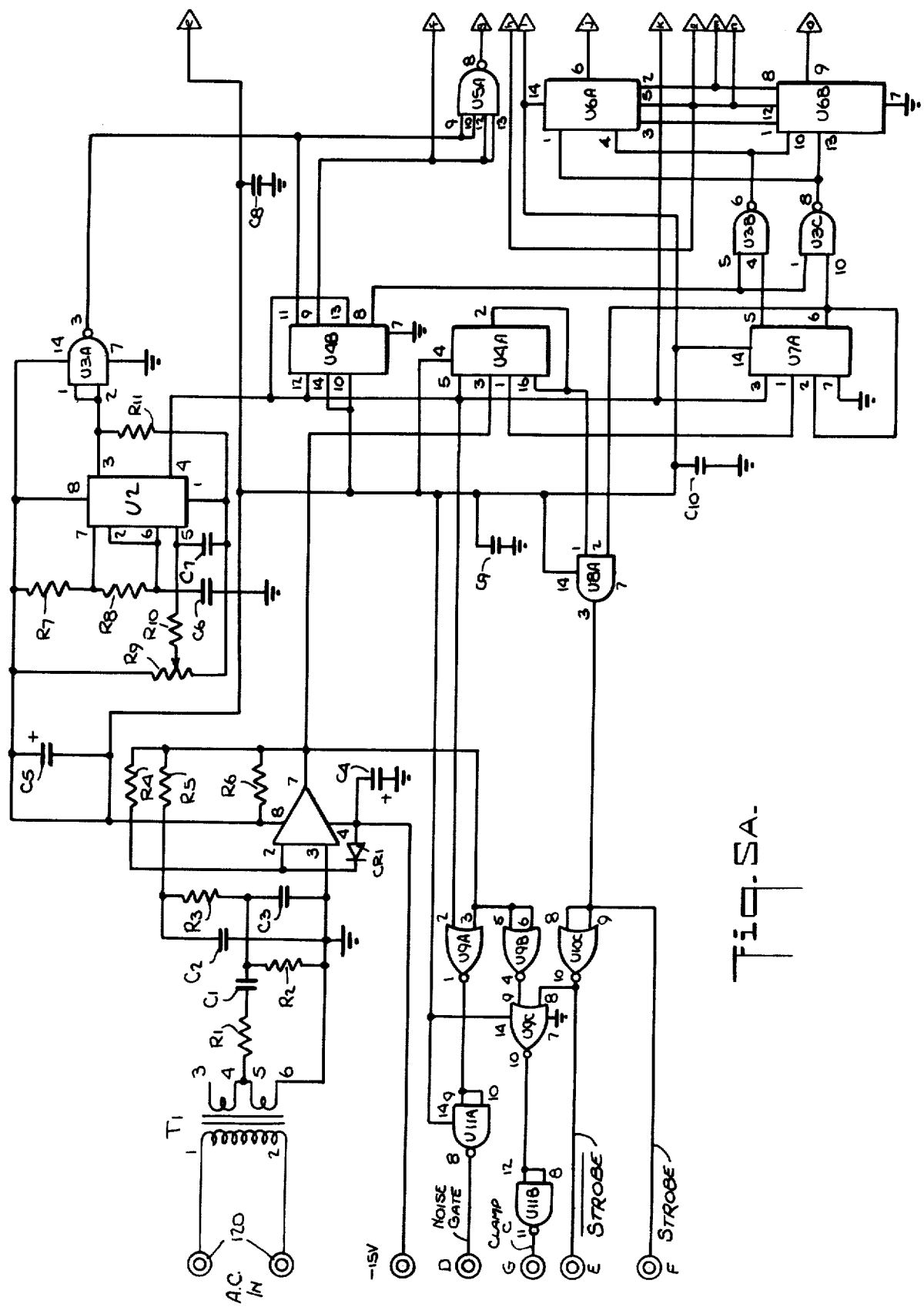

THEFT DETECTION APPARATUS USING SATURABLE MAGNETIC TARGETS

BACKGROUND OF THE INVENTION

1. Field of the Invention

This invention relates to article theft detection and more particularly it concerns improvements to article theft detection apparatus of the type wherein saturable magnetic target strips mounted on protected articles react to an applied alternating magnetic field in an interrogation zone to produce detectable magnetic fields at harmonics of the applied field.

2. Description of the Prior Art

French Pat. No. 763,681 to Pierre Arthur Picard discloses an article theft detection apparatus of the type to which this invention applies. As described in that patent, articles to be protected from theft are provided with targets in the form of thin strips of material having a high magnetic permeability which is readily and repeatedly driven into and out of saturation in the presence of an alternating magnetic field. An interrogation antenna is provided at an interrogation zone, e.g. at the exit or just past the check-out counter of a store; and means are provided to cause the antenna to generate an alternating magnetic field at a given frequency and at an intensity sufficient to saturate a target strip in the interrogation zone. As a result, the target strip itself produces magnetic fields which alternate at frequencies which are harmonics of the given transmitter frequency. A receiver antenna is also provided at the interrogation zone to receive the magnetic fields produced by the target strips. The receiver antenna is connected to a receiver which is tuned to detect signals at one or more of the harmonic frequencies produced by the target strip; and an alarm is connected to the receiver to be activated when such detection takes place.

Various refinements to the basic devices shown in the French Pat. No. 763,681 are shown and described in U.S. pending patent application Ser. No. 715,568 filed Aug. 18, 1976 and U.S. Pat. Nos. 4,074,249, 4,118,693, 3,820,103, 3,820,104, 3,673,437, 3,737,735 and 3,534,243. The United States pending patent application Ser. No. 715,568 and U.S. Pat. Nos. 4,074,249 and 4,118,693 disclose the use of a transmitter antenna on one side of an interrogation zone and a receiver antenna on the opposite side of the zone, with both the transmitter and receiver antennas connected in the form of plural offset loops. U.S. Pat. Nos. 3,820,103 and 3,820,104 both disclose the use of a transmitter antenna made of rigid metal pipe in the form of a multi-turn loop. U.S. Pat. Nos. 3,534,243, 3,673,437 and 3,737,735 disclose circuits for generating sine wave signals which can be used to energize transmitter antennas. Also, U.S. Pat. No. 4,016,553 shows transformer couplings to multiple loop transmitter and receiver antennas in a different type detection apparatus.

SUMMARY OF THE INVENTION

The present invention provides improvements to the devices shown in the prior art. According to the invention, in its different aspects, there are provided novel structures, novel antenna connections, novel antenna and novel circuit arrangements which make it possible to detect target strips with great accuracy and reliability. An especially advantageous feature of the invention is that it is well adapted to use in supermarkets where the presence of shopping carts, cash registers, and other large metal objects have made it difficult to detect target strips.

According to one aspect of the invention there is provided a novel theft detection apparatus for detecting targets in the form of thin elongated strips of easily saturable magnetic material wherein transmitter and receiver antennas are positioned across from each other on opposite sides of an interrogation zone, the transmitter antenna being formed of a single turn loop of a high electrical conductivity material, the receiver antenna being formed of a single turn outer loop of high electrical conductivity material and bisected by a length of high electrical conductivity material to form two bucking loops and a receiver connected to receive and detect alternating currents at a selected harmonic frequency which flows more heavily in one bucking loop than the other. Because of the antenna arrangement, the receiver may be tuned to select a relatively low harmonic, e.g. the sixth, with minimal interference from the transmitted fundamental frequency. Also, because of the structure of the antennas, i.e. with single turn loops, the antennas may be easily and economically constructed from metal pipe which is rigid and self supporting.

According to another aspect of the invention there is provided a novel theft detection apparatus for detecting targets in the form of thin elongated strips of easily saturable magnetic material wherein the transmitter antenna is formed of a single turn loop of a high electrical conductivity material and is substantially purely inductive, and wherein the transmitter for energizing the antenna comprises a source of alternating electrical signals, an amplifier to amplify the signals, a series resonant circuit comprising a capacitor and a first coil connected in series between the output of the amplifier and ground, the series resonant circuit being tuned to resonate at the frequency of the source of alternating electrical signals, and the first coil being inductively coupled to the transmitter antenna. This inductive coupling is carried out by means of a voltage step down transformer which provides a Q multiplication effect wherein an alternating electrical current of precisely controlled frequency and substantially pure sine wave configuration is generated in the transmitter antenna.

According to a further aspect of the invention there is provided a novel theft detection apparatus for detecting targets in the form of thin elongated strips of easily saturable magnetic material wherein the receiver antenna is formed of a loop of high electrical conductivity material and is substantially purely inductive, and wherein there is provided a coil and a capacitor connected in parallel to form a resonant circuit tuned to resonate at a selected harmonic of the transmitter frequency, the receiver antenna being inductively coupled to the coil, and the receiver being connected across the capacitor for generating an alarm in response to the occurrence of a resonance condition in the resonant circuit. The inductive coupling of the receiver antenna to the coil is carried out by means of a voltage step up transformer which provides a Q division effect wherein the parallel resonant circuit is substantially isolated from loading effects from the antenna and therefore can resonate precisely at the frequency of the selected harmonic to provide accurate detection.

According to a still further aspect of the invention there are provided further improvements in an article theft detection apparatus of the type described above and in which means are provided in the receiver to select alternating currents at higher and lower harmonics of the transmitter frequency, an alarm arranged to operate in response to antenna currents at a selected higher harmonic and a disabling circuit for disabling operation of the alarm in response to antenna current at a selected lower harmonic and greater than a predetermined magnitude relative to the magnitude of the current at the selected harmonic. These further improvements to a prior art system, as set forth above, comprise providing a receiver and transmitter antenna spaced apart sufficient to allow passage of a supermarket shopping cart with the receiver antenna being of a bucking loop construction and having a total width, in the direction of passage along the aisleway, less than the length of a shopping cart. This arrangement permits the system to be disabled when a shopping cart enters into and exits from the interrogation zone but it also permits a cancellation of the signals, at all harmonics, produced by the shopping cart, for a considerable amount of the time that it is in the interrogation zone so that during this time the apparatus will not be disabled and will be capable of detecting a target carried in the shopping cart. It is true that in prior apparatus using wider bucking loop antennas the effect of a shopping cart would produce cancellation but the shopping cart was balanced in the loops only for an extremely short period whereas in the present case the balancing characteristics are preserved for a longer portion of the shopping cart's passage through the interrogation zone.

According to a still further aspect of the present invention, there are provided additional improvements in article theft detection apparatus as above described wherein a saturable magnetic target in an interrogation zone receives an interrogating magnetic field at a fundamental frequency and generates magnetic fields at higher harmonics which are selected and used to operate an alarm and wherein signals at lower harmonics, for example, those produced by large metal objects, are selected and used to disable the alarm. These additional improvements are based on the discovery of a phenomenon, not yet fully explainable, whereby the amplitude of the selected lower harmonic produced by a large metal object, such as a shopping cart, actually decreases for a short time both during entry and exit from the interrogation zone. According to the invention there is provided a circuit responsive to a decrease in the amplitude of the selected lower harmonic signal received at the receiver antenna to further disable operation of the alarm, at least during the interval in which the decrease is present.

There has thus been outlined the more general aspects of the invention in order that the detailed description thereof that follows may be better understood, and in order that the present contributions to the art may be better appreciated. There are, of course, additional features of the invention that will be described more fully hereinafter. Those skilled in the art will appreciate that the conception on which this disclosure is based may readily be utilized as the basic for the designing of other apparatus for carrying out the several purposes of the invention. It is important, therefore, that this disclosure be regarded as including such equivalent apparatus as to not depart from the spirit and scope of the invention.

BRIEF DESCRIPTION OF THE DRAWINGS

A selected embodiment of the invention has been chosen for purposes of illustration and description, and is shown in the accompanying drawings, forming a part of the specification, wherein:

FIG. 3 is a side elevational view of the antenna portion of the theft detection apparatus of FIG. 1 arranged in conjunction with a supermarket checkout counter;

FIG. 4 is a top plan view of the apparatus shown in FIG. 3;

FIGS. 5A and 5B together constitute a schematic wiring diagram of the synchronizer and transmitter portion of the apparatus of FIG. 1;

DETAILED DESCRIPTION OF A PREFERRED EMBODIMENT

Figure 1:
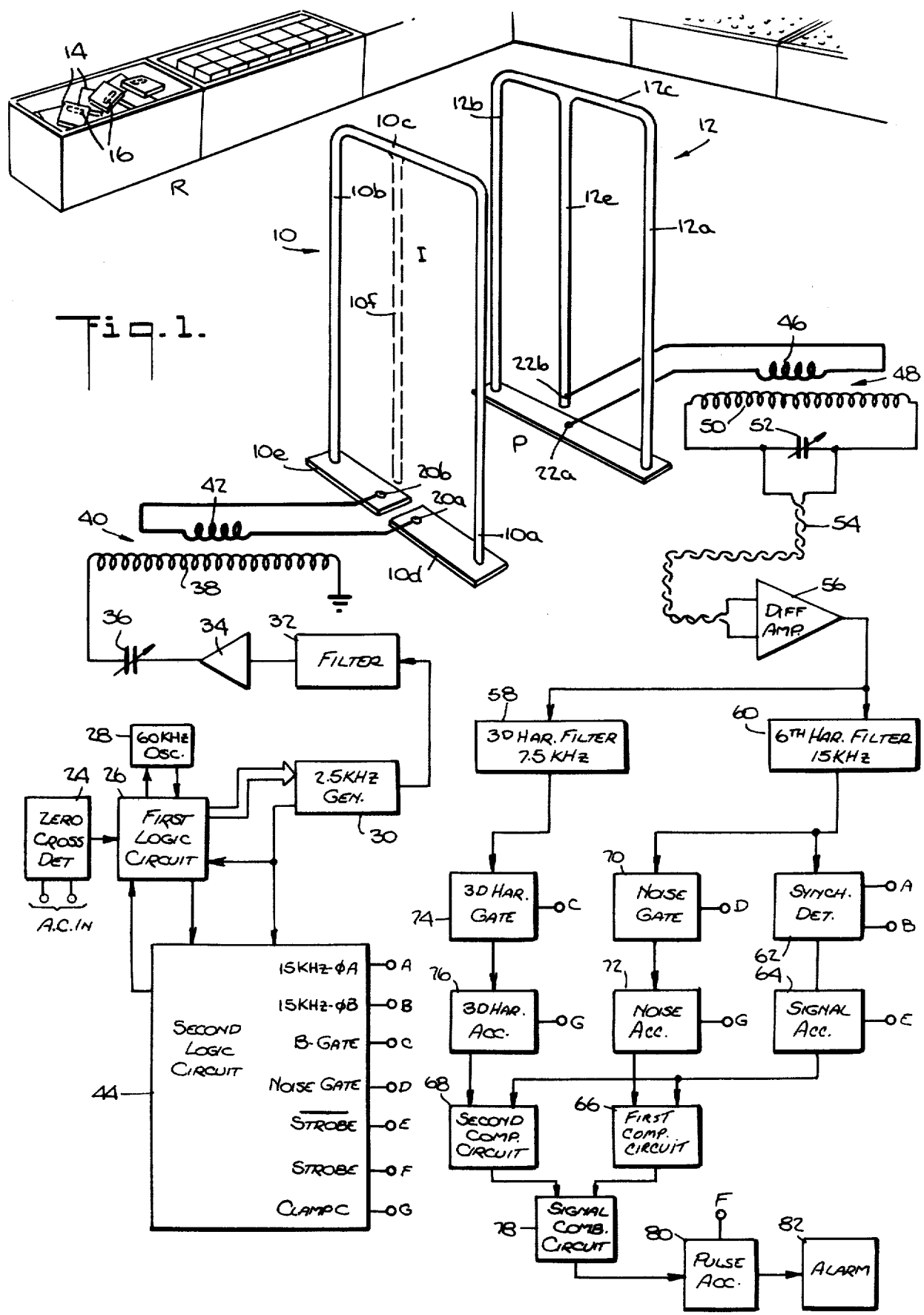
FIG. 1 is a perspective view of a theft detection apparatus in which the present invention is embodied, with portions of the system shown schematically and in block diagram form.

As shown in FIG. 1, a transmitter antenna 10 and a receiver antenna 12 are positioned on opposite sides of an egress passageway P from a protected region R. The protected region contains protected articles 14. For example, the protected region may be the interior of a supermarket and the protected articles 14 may be the merchandise in the supermarket, such as meats, vegetables and packaged goods. The protected articles are provided with special targets 16 in the form of a thin elongated strip of easily saturated magnetic material. U.S. patent application Ser. No. 151,584 filed May 20, 1980, and assigned to the assignee of the present invention, describes preferred forms of such targets.

The egress passageway is arranged such that a person must pass through it in order to exit from the protected region R. The zone between the antennas 10 and 12 is referred to herein as the interrogation zone and it forms part of the egress passageway P. If a person exits from the protected region R carrying one of the protected articles 14, its target 16, upon being carried through the interrogation zone between the antennas will produce a predetermined and detectable electromagnetic field disturbance and cause an alarm to be activated. The antennas 10 and 12 are located along the passageway P beyond a checkout or cashier's station (not shown in FIG. 1), where articles being purchased are checked and paid for. When a protected article 14 is paid for its target 16 is deactivated, by means to be described hereinafter, so that the article may be taken through the interrogation zone without activating the alarm.

As will be described below, the transmitter antenna 10 produces, in the interrogation zone, an alternating magnetic field of predetermined frequency, e.g. 2.5 kilohertz, at an intensity sufficient to cause a target 16 in the zone to become magnetically saturated and unsaturated during each cycle of the alternating magnetic field. This in turn causes the target to emit its own alternating magnetic fields which are at harmonics of the predetermined frequency of the field produced by the transmitter antenna. The receiver is constructed to respond to a selected harmonic frequency, e.g. the sixth harmonic at 15 KHZ, and to activate an alarm when a magnetic field alternating at that frequency is present at the receiver antenna 12.

The transmitter antenna 10 is formed of a single one turn loop of high electrical conductivity material such as a rigid metal pipe which is self supporting. It is preferred to use 6063T6 aluminum alloy pipe having an outside diamter of 1.050 inches (2.7 cm) and a wall thickness of b 0.113 inches (28 mm). The antenna 10 is formed into rectangular configuration with two vertical lengths 10a and 10b interconnected at their upper ends by a horizontal length 10c. The lower ends of the vertical legs are connected, as by welding, to flat aluminum plates 10d and 10e which extend toward each other but do not touch. Connector terminals 20a and 20b are located at the end of each of the plates 10d and 10e. The transmitter antenna 10, as shown in FIG. 1, is positioned so that its plane extends along one side of the passageway P. Preferably the transmitter antenna 10 has a height of about five feet (152 cm) and a width (in the direction of the passageway P) of about two feet (61 cm).

The receiver antenna 12 is made of the same material as the transmitter antenna 10; and it has nearly the same construction. Thus the receiver antenna is also made of a high electrical conductivity material such as aluminum pipe; and it has two vertical lengths 12a and 12b interconnected at their upper ends by an upper horizontal length 12c. The lower ends of the vertical lengths 12a and 12b of the receiver antenna 12 are also connected, as by welding, to an aluminum plate 12d which extends continuously between the lengths 12a and 12b to form a one turn loop. A vertical length 12e of high electrical conductivity material, which may be also of aluminum pipe, is connected to the center of the upper horizontal length 12c and extends down therefrom to bisect the one turn loop. In this embodiment, the vertical length 12e terminates a short distance above the center of the aluminum plate 12d. Connector terminals 22a and 22b are located at the center of the aluminum plate 12d and the lower end of the central vertical length 12e respectively.

The receiver antenna 12 has the same exterior dimensions as the transmitter antenna 10 and it is positioned parallel to the transmitter antenna and in alignment with it along the opposite edge of the passageway P. Thus the receiver antenna 12 has a height of about five feet (152 cm) and a total width (in the direction of the passageway P) of about two feet (61 cm). The width of each of the receiver antenna loops is thus about one foot (30 cm). The transmitter and receiver antennas are spaced apart from each other by about thirty-two inches (82 cm) which is sufficient to permit passage of a standard supermarket shopping cart and is the width of a supermarket aisleway past a checkout station.

It will be seen from the foregoing that the transmitter antenna 10 forms a single one turn loop between its connector terminals 20a and 20b while the receiver antenna forms a pair of single turn loops, electrically connected in parallel between the connector terminals 22a and 22b and sharing a common portion, namely, the central vertical length 12e.

The transmitter antenna 10 may also be provided with an additional vertical element, as indicated by dashed lines at 10f, to physically match the vertical length 12e of the receiver antenna 12. The element 10f, however, is not electrically part of the transmitter antenna and is provided only for aesthetic purposes.

The means for energizing the transmitter antenna 10 will now be described. As shown in FIG. 1, electrical power from a standard alternating current source (not shown is applied to a zero crossing detector 24. The zero crossing detector produces a pulse each time the applied voltage passes through zero. These pulses are applied through a first logic circuit 26 to a 60 KHZ oscillator 28. The first logic circuit 26 activates the 60 KHZ oscillator during alternate time periods of equal length. If the alternating current source is 60 HZ, as in North America, the time periods are each 1/60 second but if the alternating current source is 50 HZ, as in Europe, the time periods are each 1/50 second. The following description is based on the use of a 60 HZ source but it will be understood by those skilled in the art that the 50 HZ source will produce a corresponding sequence of operation.

The outputs from the 60 KHZ oscillator 28 are square wave signals at 60 KHZ. These square wave signals are supplied to the first logic circuit 26 where they are divided down and converted to four separate 15 KHZ signals, each at a different phase. The 15 KHZ signals are applied to a 2.5 KHZ generator 30 which divides them down further and produces square wave signals at 2.5 KHZ during those time periods that the 60 KHZ oscillator 28 is on. The first logic circuit 26 is constructed to cause the successive 2.5 KHZ outputs of the 2.5 KHZ generator 30 to be mutually displaced in phase by 30° in successively opposite directions. That is, if the first 2.5 KHZ output begins at 0° phase angle, the second output will be delayed sufficiently so that its phase would be 30° behind that of the first output. The third output will be advanced back to 0° phase angle and the fourth output will be delayed back to 30° lagging.

The square wave outputs from the 2.5 KHZ generator 30 are applied to a filter circuit 32 which converts these signals to an essentially pure sine wave at 2.5 KHZ. This sine wave is amplified in an output amplifier 34 and is then applied to a series resonant circuit comprising a capacitor 36 and a first transmitter transformer coil 38 connected in series between the output of the amplifier 34 and ground. The coil 38 forms the primary of a ferrite core transformer 40. A second transmitter transformer coil 42 forms the secondary of the transformer 40 and this second coil is connected at its ends to the connector terminals 20a and 20b of the transmitter antenna 10.

The output amplifier 34 may be a conventional solid state amplifying device such as an RCA HC 2500 amplifier which has an output impedance of substantially zero ohms.

The capacitor 36 has a capacitance of about four microfarads; and, if desired, it may be made up of several one microfarod capacitors connected together in parallel. The first transmitter transformer coil 38 is formed of eighty-one turns of number 18 gauge wire and its inductance is 1.4 millihenrys. Together, the capacitor 36 and the first transmitter transformer coil 38 form a series resonant circuit tuned to resonate at 2.5 KHZ. The Q of the resonant circuit is relatively low however because the first coil 38 is loaded with high effective impedance from the second coil 42.

The second transmitter transformer coil 42 is formed of four turns of low resistance wire cable. This wire cable, in the preferred embodiment, is formed of three twisted groups of seven strands each of number 20 copper wire. The inductance of the coil 42 is negligible.

It will be appreciated from the foregoing that the transmitter antenna is formed of a single turn loop of high electrical conductivity material and that, together with the second coil 42, it is substantially purely inductive. Also, by virtue of the transformer comprising the coils 38 and 42, the 2.5 KHZ output of the output amplifier 34 is inductively coupled to the transmitter antenna 10. The substantially pure inductance of the transmitter antenna 10, in turn, imposes a load on the series resonant circuit comprising the capacitor 36 and the first transmitter coil 38 so that the circuit will resonate at 2.5 KHZ without drawing excessive current from the amplifier. Thus the transmitter antenna may be driven to produce high currents without need for such currents to flow in the output amplifier.

The arrangement of the circuits between the output amplifier 34 and the transmitter antenna 10 provide an improved coupling between the amplifier and antenna which permits the generation of very high electrical currents (e.g. 112.79 amperes RMS) in the antenna 10 at a precisely controlled frequency, and in very pure sine wave form, using a commonly available power amplifier having relatively low output impedance. The manner in which this is accomplished is the provision of Q multiplication. The loading of the series resonant circuit by the antenna 10 and the second transmitter transformer coil 42 causes that circuit to exhibit a relatively high impedance to the output amplifier 34. In other words the output amplifier 34 is required to drive only a low Q circuit so that it is capable of maintaining at its output the purity of the sine wave signal supplied at its input. In fact, the reflected impedance from the second coil 42 back to the first coil 38 corresponds to the square of the turns ratio between the first and second coils. As a result, the output amplifier 34 is subjected to very little current drain and yet it effectively drives very large currents through the antenna 10. Moreover the current flow through the antenna 10 can be maintained at a very precisely controlled frequency and in the form of a very pure sine wave.

The 2.5 KHZ generator 30 additionally produces outputs which are applied to the first logic circuit 26 as well as to a second logic circuit 44. The second logic circuit 44 is also connected to transmit signals to and to receive signals from the first logic circuit 26.

The second logic circuit 44 operates to produce synchronizing and timing signals at various output terminals A, B, C, D, E, F and G which are used in processing signals received at the receiver antenna 12. The synchronizing and timing signals produced at the various terminals of the second logic circuit 44 are set forth in the following table.

| TERMINAL | SIGNAL |
| --- | --- |
| A | 15 KHZ - Phase A |
| B | 15 KHZ - Phase B |
| C | B Gate |
| D | Noise Gate |
| E | $\overline{\text{Strobe}}$ |
| F | Strobe |
| G | Clamp C |

Figure 5B:
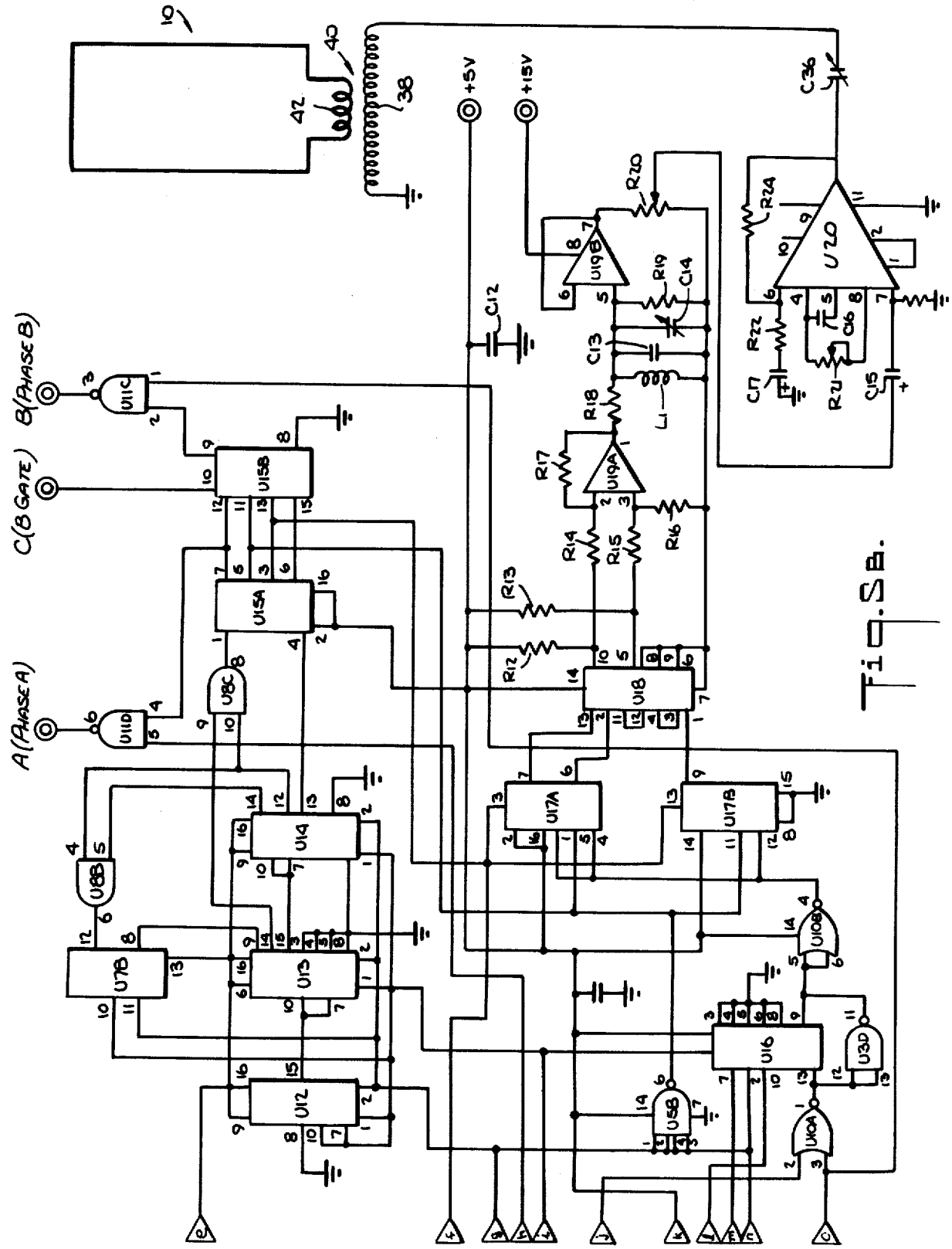

The specific circuits for generating these signals are shown in FIGS. 5A, and 5B; and the signals themselves are shown diagrammatically in FIG. 2, all of which are discussed hereinafter.

The circuits for processing the signals received by the receiver antenna 12 will now be described. As shown in FIG. 1 a first receiver transformer coil 46 is connected at its ends to the connector terminals 22a and 22b of the receiver antenna 12. The first receiver coil 46 is of the same construction as the second transmitter transformer coil 42. That is, it comprises four turns of low resistance wire cable which, in the preferred embodiment, is formed of three twisted groups of seven strands each of number 20 aluminum wire. The inductance of this coil is negligible. The coil 46 forms the primary of ferrite core receiver transformer 48. A second receiver transformer coil 50 is arranged to form the secondary of the receiver transformer 48. This second coil is made up of three hundred forty turns of number 20 copper wire. The inductance of the coil 50 is about 10 milihenrys.

A receiver input capacitor 52 is connected across the second receiver transformer coil 50 to form a parallel resonant circuit. This circuit resonates at 15 KHZ. The output from the parallel resonant circuit formed by the coil 50 and capacitor 52 is taken from across the capacitor and is delivered, via a twisted pair of wires 54 to a differential amplifier 56.

It will be appreciated from the foregoing that the receiver antenna is formed of two single turn loops of high electrical conductivity material and that, together with the first receiver coil 46, it is substantially purely inductive. Also, by virtue of the transformer coupling between the coils 46 and 50, the 15 KHZ electrical currents flowing in the receiver antenna are inductively coupled to the parallel resonant circuit.

The above described receiver antenna connections to the differential amplifier 56 provide special advantages in a detection system of the type described herein. This, in part, is because the receiver antenna 12 and the first receiver transformer coil 46 together permit large current flow as a result of the changing magnetic fields produced by the target strips 16 and yet the second receiver transformer coil 50 and the capacitor 52 are effective to select precisely those current flows which occur at 15 KHZ and to apply a corresponding voltage signal to the differential amplifier 56. In other words, a Q division is produced at the transformer 48; and the resonant circuit comprising the coil 50 and capacitor 52 resonates with relatively low current but relatively high voltage. The differential amplifier 56 receives all of the signal frequencies which the antenna 12 supplies to the transformer 48; but, because of the parallel connected resonant circuit formed of the coil 50 and capacitor 52, those signals at 15 KHZ will experience maximum gain relative to signals at other frequencies.

The receiver antenna 12, as stated above, is formed of two parallel loops. As a result, a changing magnetic field applied uniformly to the two loops will induce bucking currents which will cancel each other. By providing the transmitter antenna 10 in alignment with the two loops of the receiver antenna as above described the large magnetic fields produced by the transmitter antenna will induce substantially equal amplification but bucking or cancelling currents in the antenna. Thus the effects of the transmitter signals are substantially cancelled in the receiver antenna. When a target 16 passes through the passageway however it will pass first closer to one of the receiver antenna loops than the other and then it will pass closer to the other loop than the first. Consequently the harmonic magnetic fields from the target 16 will always be stronger at one of the receiver loops than the other so that unbalanced bucking currents are produced which result in a detectable net current flow in the first receiver transformer coil 46.

The output from the differential amplifier 56 is applied simultaneously to a third harmonic (7.5 KHZ) filter 58 and to a sixth harmonic (15 KHZ) filter 60.

Outputs from the sixth harmonic filter 60 are potential target produced signals. Outputs from the third harmonic filter 58 are potential interfering signals from other metal objects, such as shopping carts, and they are used to disable alarm operation which would otherwise be caused by the sixth harmonic signals. Both the target strips 16 and other metal objects such as shopping carts respond to the interrogating magnetic field by producing magnetic fields at various harmonics. In the case of the target strips 16, however, the amplitude ratio of the sixth harmonic to the third harmonic is much higher than is the case of a shopping cart. Therefore when the incoming signals include a relatively high amplitude sixth harmonic and a relatively low third harmonic, an alarm is generated but when the incoming signals have a relatively high third harmonic and a relatively low sixth harmonic the production of an alarm is inhibited.

The output from the sixth harmonic (15 KHZ) filter 60 is applied to a synchronous detector and filter 62 to which is also applied the 15 KHZ phase A and the 15 KHZ phase B synchronous signals from the terminals A and B of the second logic circuit 44. The outputs from the synchronous detector and filter 62 are supplied to a signal accumulator 64 which also receives the Strobe timing signals from the terminal E of the second logic circuit 44. The outputs from the signal accumulator 64 are applied to first and second comparison circuits 66 and 68.

The output from the sixth harmonic filter 60 is also applied to a noise gate 70 which receives noise gate timing signals from the terminal D of the second logic circuit 44. The outputs from the noise gate 70 are applied to a noise accumulator 72 which also receives the clamp C timing signals from the terminal G of the second logic circuit 44. The output from the noise accumulator 72 is applied to the first signal comparison circuit 66 for comparison with the signals from the signal accumulator 64.

The output from the third harmonic filter 58 is applied to a third harmonic gate 74 which also receives B Gate timing signals from the terminal C of the second logic circuit 44. The output from the third harmonic gate 70 is applied to a third harmonic accumulator 76. Clamp C timing signals from terminal G of the second logic circuit 44 are also applied to the third harmonic accumulator 76. Outputs from this circuit are applied to the second signal comparison circuit 68 for comparison with the signals from the signal accumulator 64. If the signals from the signal accumulator 64 are sufficiently large compared to those from the noise and third harmonic accumulators 72 and 76, the outputs of the comparison circuits 66 and 68 are combined in a signal combining circuit 78 which supplies pulses to a pulse accumulator 80. The pulse accumulator 80 also receives Strobe timing signals from the terminal F of the second logic circuit 44 to control the timing and duration of pulse accumulation. Upon the accumulation of a predetermined number of pulses (e.g. two pulses) during successive transmitter signal intervals, the pulse accumulator will supply an actuation signal to an alarm 82.

Figure 2:
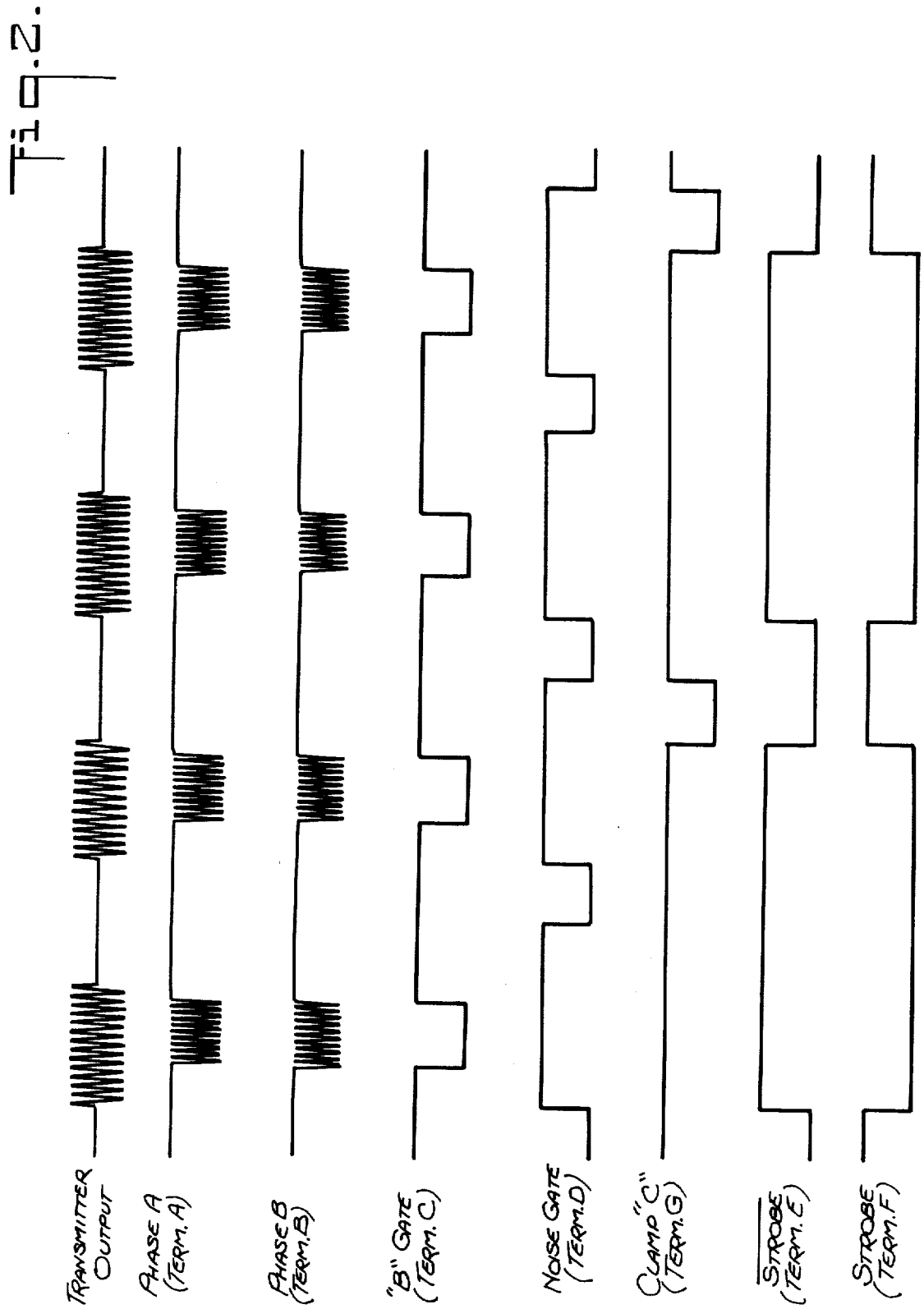
FIG. 2 is a timing diagram useful in explaining the sequence of operation of the apparatus of FIG. 1.

The operation of the apparatus of FIG. 1 is best explained in conjunction with the timing diagram of FIG. 2 which shows the relative sequence of signals at each of the terminals A-G of the second logic circuit 44 and at the corresponding receiver components to which those signals are applied.

As shown in FIG. 2, the transmitter output (which is controlled by the 2.5 KHZ generator 30 from the first logic circuit 26) occurs during one sixtieth (about 0.02) second intervals separated by one sixtieth (about 0.02) second intervals. Thus the transmitter is turned on and off in continuous fashion. During the time a protected article 14 having a target 16 is carried through the passageway P, the target will be subjected to the magnetic fields generated during several of these transmission intervals and the target will then generate its own response signals at several harmonics including the sixth harmonic (15 KHZ).

The purpose for turning the transmitter off in successive time periods is to permit the apparatus to monitor the interrogation zone for the presence of any extraneous 15 KHZ magnetic fields which might cause a false alarm.

As stated above, the 2.5 KHZ transmitter signals are shifted alternately back and forth by 30° in successive transmission intervals. When a target 16 is placed within the magnetic field produced by the transmitter signals, the target in turn produces its own magnetic signals at harmonics including the sixth harmonic or 15 KHZ. Because the successive transmitter signals are displaced 30° relative to each other, the successive target produced sixth harmonic signals will be displaced 180° relative to each other. The signals produced by a target vary in phase and amplitude with the location and orientation of the target in the interrogation zone. By causing the target to produce signals at different phases, e.g. by transmitting interrogation fields at different phases, the possibility of detecting the target is improved.

In the detection process, only a portion of each transmitter transmission interval is used for detection of signals. The purpose of this is to avoid possible false alarms due to transients which occur when the transmission of 2.5 KHZ signals starts and stops. The portion of the transmission intervals used for detection are the same as the time during which the phase A and phase B 15 KHZ signals are being supplied to the synchronous detector and filter 62 from the terminals A and B of the second logic circuit 44. Those signals permit the synchronous detector and filter 62 to respond to any 15 KHZ signals which may be received at the receiver antenna 12 during those intervals.

During the same time intervals that the synchronous detector and filter 62 is enabled to respond to received 15 KHZ signals, the third harmonic gate 74 is enabled to pass any received third harmonic (7.5 KHZ) signals which have been passed by the third harmonic filter 58. The gate 74 is opened by the B gate signal from the C terminal of the second logic circuit 44.

During a portion of each non-transmission interval the receiver monitors the receiver antenna for the presence of 15 KHZ signals. Any 15 KHZ signals which occur while the transmitter is not transmitting are indicative of a false alarm situation; and those signals, which are referred to as "noise", are used to prevent the actuation of the alarm even when the 15 KHZ signals are detected during subsequent transmission intervals. As in the case of signal and third harmonic monitoring during only a portion of the transmission intervals, the noise is monitored only during a portion of the non-transmission intervals. This serves to avoid unreliable indications which can result from monitoring during the transient intervals when the transmitter is being turned on and off. The receiver monitors the 15 KHZ noise during a portion of the non-transmission intervals by opening the noise gate 66 during such portions of the non-transmission intervals. This is done by applying the noise gate signals from the terminal D of the second logic circuit 44 to open the noise gate 66.

The outputs from the third harmonic gate 70 and the noise gate 66 occur at different times but they are accumulated in the third harmonic and noise accumulator for a duration established by the Clamp C signal from the terminal G of the second logic circuit 44. As can be seen in FIG. 2, the clamp C signal extends for a duration corresponding to two successive transmission intervals. If the noise and third harmonic signals accumulated during this time exceed a predetermined amount in relation to the sixth harmonic signals which have been accumulated during the intervening transmission intervals they will act in the first and second comparison circuits 66 and 68 to prevent pulses from being applied to the pulse accumulator 80.

As pointed out above, the signals passed by the sixth harmonic filter 60 are, during a portion of each transmission interval, processed in the synchronous detector and filter 62 which receives the 15 KHZ phase A and phase B synchronous signals from terminals A and B of the second logic circuit 44. The 15 KHZ signals at terminals A and B are in phase quadrature with each other. Therefore irrespective of the phase of the signal from the sixth harmonic filter 60, it will never be more than 45° out of phase with at least one of the synchronous signals. At the same time the synchronous detector 62 will reject any signals at the 2.5 KHZ transmitter frequency which may have passed through the filter 60.

The signals which have passed through the synchronous detector and filter 62 are accumulated in the accumulator 64 for a duration corresponding to two successive transmission intervals before they are compared to the noise and third harmonic signals in the signal comparison circuits 66 and 68. The timing is accomplished by means of the Strobe signal applied from terminal E of the second logic circuit 44 to the signal accumulator 64. The accumulated sixth harmonic signals from the accumulator 64 are then compared in the first and second signal comparison circuits 66 and 68 to the accumulated noise and third harmonic signals from the accumulators 72 and 76; and if the signals from the accumulator 64 are sufficiently large in comparison to those from the accumulators 72 and 76, the signal comparison circuits 66 and 68 will produce an output via the signal combining circuit 78 to the pulse accumulator 80. The signals passed by the noise and third harmonic gates 72 and 76 are also accumulated in their respective accumulators 72 and 76 for the duration of two successive transmission intervals and the timing for this is controlled by the clamp C signal applied to those accumulators from the terminal G of the second logic circuit 44.

The pulse accumulator 80 will produce an alarm actuation signal to the alarm 82 upon the receipt of outputs from the comparator in the interval of two successive transmitter outputs. The timing for this is controlled by the Strobe signal which is applied to the pulse accumulator 80 from the terminal F of the second logic circuit 44.

FIGS. 3 and 4 illustrate the use of the detection device of this invention in the environment of a supermarket checkout station. As can be seen in these figures the passageway P from the merchandise storage and display area of the supermarket is formed as an aisleway between adjacent checkout counters 90. This aisleway has a width of about thirty two inches (81 cm) which allows for passage of a supermarket shopping cart 92. The counter 90 has a receiving area 94 where a shopper deposits the merchandise to be checked out by a cashier. The receiving area 94 has a conveyor belt or other suitable means to move the merchandise along the counter as it is checked out and its price tabulated by the cashier. A cash register 96 is placed alongside the counter near the receiving area 94.

The transmitting and receiving antennas 10 and 12 are positioned across from each other on opposite sides of the passageway P just downstream of the cash register 96.

When a customer 98 checks out his or her merchandise the customer loads the contents of the shopping cart 92 onto the receiving area 94 of the counter 90. A cashier 100 standing on the opposite side of the counter 90 at the cash register 96 moves the merchandise along the counter and at the same time the cashier rings up the price of each item on the cash register. The customer meanwhile pushes the now empty cart 92 between the antennas 10 and 12 and then walks between the antennas behind the cart to a bagging region 101 of the counter 90 to receive the goods after paying for them. If the customer 98 attempts to avoid having any article 14 checked by the cashier and instead tries to conceal the article in the shopping cart or on his or her person (as shown in FIG. 3), the target 16 on the article 14 will be detected as it passes between the antennas and the alarm will be actuated.

It is usually preferable that the targets 16 be deactivated, i.e. rendered non-detectable, when they are checked out by the cashier. For this purpose there is provided one or more powerful magnets 102 under the counter 90 near the cash register 96. The targets 16 have small elements of magnetizeable material (not shown) distributed along their length; and when these elements are subjected to a strong magnetic field they become magnetized and develop a steady magnetic field of their own which maintains the target 16 saturated and therefore unaffected by the alternating magnetic field developed by the transmitter antenna 10.

As can be seen in FIGS. 3 and 4 the antennas 10 and 12 occupy a distance of only two feet (61 cm) in the direction of passage through the interrogation zone. Further, both of the bucking loops of the receiver antenna 12 are located within this two foot (61 cm) distance, i.e. each bucking loop has a width of one foot (30 cm). This arrangement has been found especially effective in supermarket applications where store patrons push shopping carts through the interrogation zone after having unloaded their contents onto the checkout counter. The detection apparatus, as explained above, is designed to become deactivated in response to signals at the third harmonic of the transmitted signals (e.g. 7.5 KHZ) which are characteristic of large metal objects such as shopping carts. When the shopping cart has been pushed through the interrogation zone the shopper pushing the cart will still be within the interrogation zone long enough for the system to recover from the deactivation effects of the shopping cart and to respond to the effects of a target strip 16 on any articles of merchandise the shopper may have hidden on his person.

In the past it was considered advantageous to have the transmission and receiver antennas both of the bucking loop type and both of substantial distance along the direction of movement through the interrogation zone. However, it has been found that by using narrow width antennas, and by having only the receiver antenna be of the bucking loop type, the variation in amplitude of the third harmonic signals produced by a shopping cart as it passes through the interrogation zone is more uniform than it was when wider bucking loop transmitter and receiver antennas were used. This feature is made use of in the present invention to provide improved sensitivity. Specifically, the second comparison circuit 68 (FIG. 1) can be set so that a pulse will be transmitted to the pulse accumulator 80 when the amplitude at the output of the signal accumulator 64 is low relative to the amplitude at the output of the third harmonic and noise accumulator 68. In the past, the apparatus had to be set so that a pulse would not be transmitted to the comparator 66 unless the output at the signal accumulator 64 was substantially higher relative to the output from the third harmonic accumulator 76. This occurred because when a large metal object, such as a shopping cart, was pushed through the interrogation zone it would produce a third harmonic signal which varied greatly in amplitude and a sixth harmonic signal which did not vary so greatly. Thus, to avoid false detection of the shopping cart sixth harmonic signal it was necessary to set the second comparison circuit such that even a very small amplitude third harmonic signal would prevent detection of a sixth harmonic signal.

In spite of the foregoing it is not possible to reduce indefinitely the width of the antennas in the direction of egress through the passageway P. This is because a target carried through the passageway must be closer to one receiver antenna loop than the other to unbalance the receiver antenna and produce a detectable signal. It has been found that satisfactory performance is achieved with an antenna width of about twenty four inches (61 cm) in the direction of egress through the passageway P when the passageway itself has a width of about thirty two inches (81 cm).

Theft detection systems for detecting target strips of magnetically saturable material have been proposed in the past wherein a single loop transmitter antenna is arranged in substantially coplanar relationship with a bucking loop receiver antenna, for example, as shown in FIG. 11 of the above referred to French Pat. No. 763,681 to Picard. In the Picard device very high harmonics from the target strip, e.g. the ninth, eleventh, etc, are detected. In such an arrangement, because the transmitted signal is so far removed in frequency from the desired target produced harmonic, the transmitted signal can be filtered easily in the receiver. However there is a disadvantage in such a device because large amounts of transmitted power are required to cause a target to generate detectable signals at such high harmonics. Also in such devices it is difficult to maintain the required precision of frequency and purity of the sine wave of the transmitted signal. In the present invention a lower target produced harmonic frequency, e.g. the sixth harmonic, is detected. This requires lower transmitter power and it permits more precise frequency control than is available in the detection of higher target produced harmonic signals. Because lower detected harmonics are closer to the transmitted frequency than higher harmonics, the lower harmonics are more difficult to filter from the transmitted frequency. However in the present invention the transmitter antenna 10 is located across the passageway P from the receiver antenna 12. As a result, the intensity of the transmitted magnetic field at the receiver antenna is far less than in the case where the transmitter and receiver antennas are on the same side of the passageway. Consequently the fundamental frequency signals produced in the receiver by the transmitter are of minimal intensity and they can be filtered effectively even from such close harmonics as the sixth harmonic.

It is also possible with the present invention to protect against false detection of sixth harmonic signals from large metal objects such as shopping carts and at the same time to detect the sixth harmonic signals produced by a target 16 carried in the shopping cart. This is achieved, according to the invention by forming the receiver antenna 12 so that each of its bucking loops is substantially narrower in width, i.e. along the direction of passage through the interrogation zone, than the length of the shopping cart. As a result, the shopping cart occupies the full space across both bucking loops during a considerable portion of its passage through the interrogation zone. This results in the maintenance of a balanced condition in the receiver antenna 12 for all harmonics which may be produced by the shopping cart. The balanced condition will result in no detection of the third harmonics from the shopping cart so that the apparatus will not be disabled. At the same time, the balanced condition will prevent detection of any sixth harmonic signals produced by the shopping cart. However if a protected article is present either in the cart or on the person of a customer in the interrogation zone, its target will be closer to one receiver loop than the other and the resulting unbalance between the loops will allow it to be detected.

Figure 6A:
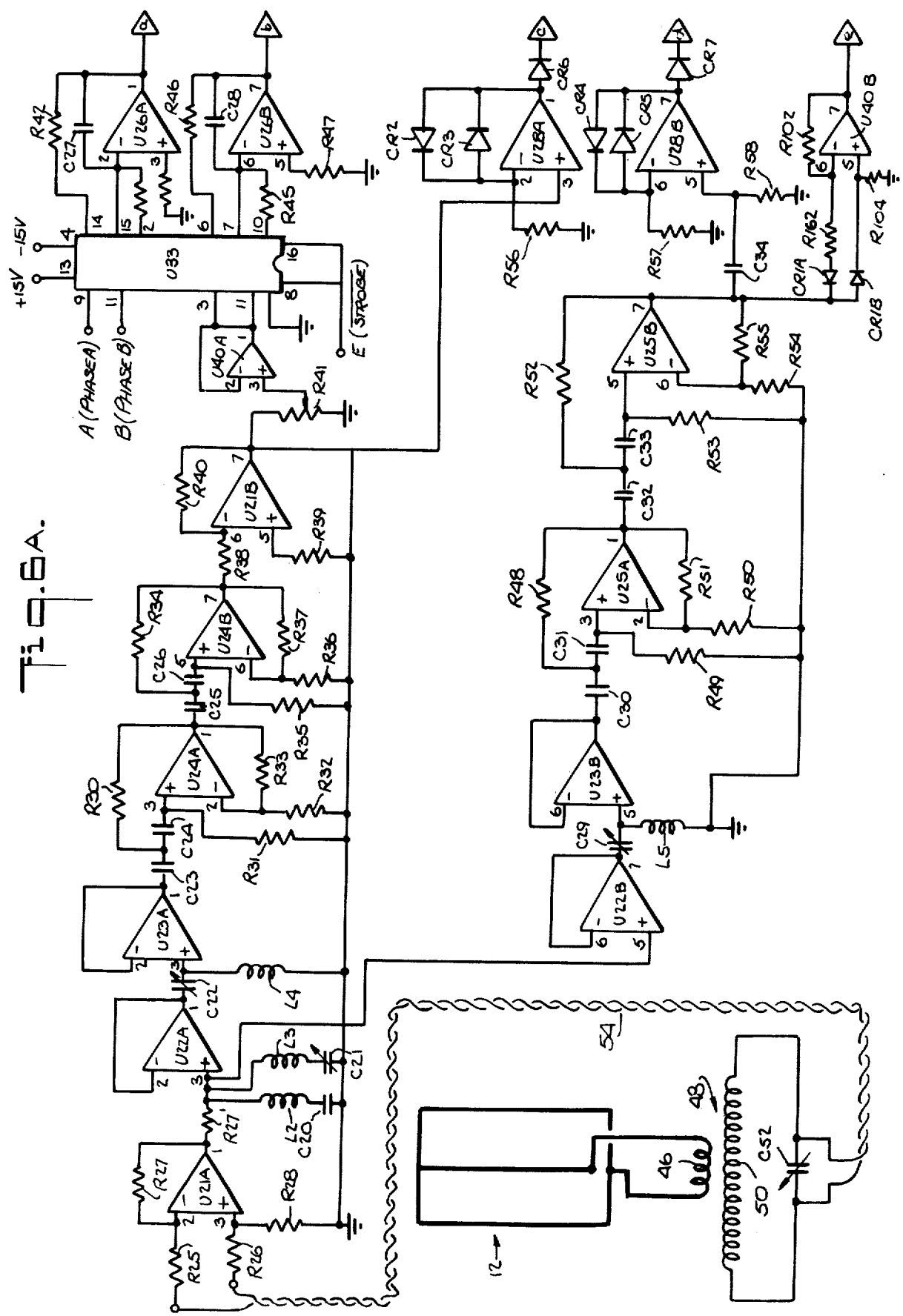
FIGS. 6A and 6B together constitute a schematic wiring diagram of the receiver and alarm portion of the system of FIG. 1.
Figure 6B:
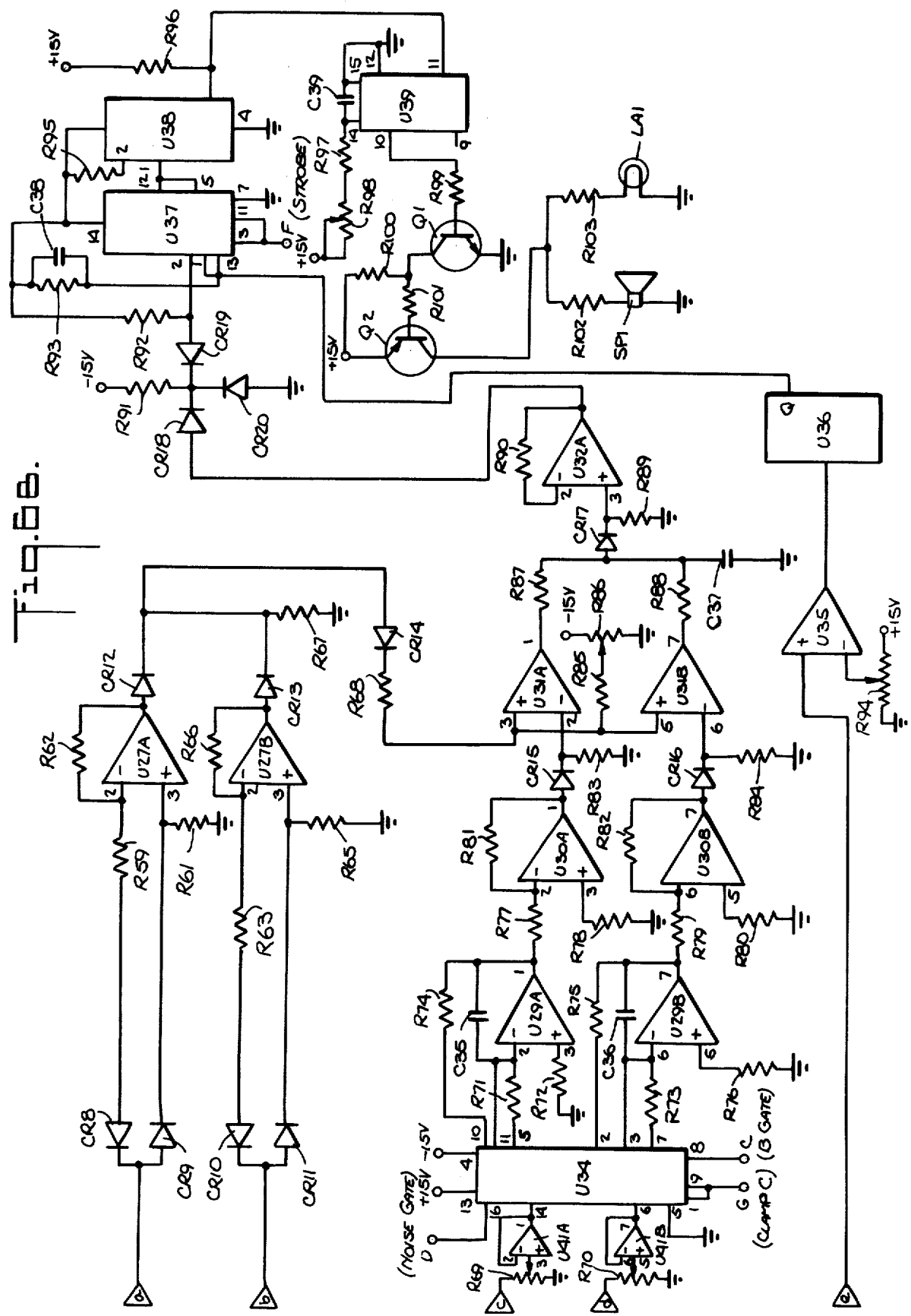

FIGS. 5A and 5B show the details and circuit connections for the components in FIG. 1 which produce the transmitter antenna signals and the synchronizing and timing signals. FIGS. 6A and 6B show corresponding details of the receiver components which process the signals received at the receiver antenna 12 and generate activation signals for the alarm 74. In FIGS. 5A, 5B, 6A and 6B standard integrated circuits are shown with their pin numbers and identified pin connections. Because the various integrated circuits are standard the direct current biasing connections, which are well known, have not been represented.

As shown in FIGS. 5A and 5B alternating current (A.C.) at 60 HZ (or 50 HZ if in Europe) is applied at a pair of A.C. input terminals 120 to the primary of a transformer T-1. The output of the transformer is applied to a zero crossing detector comprising an operational amplifier U1, resistors R1-R6, capacitors C1-C4 and control rectifier CR1. The zero crossing detector supplies an output each time the A.C. input signal passes through zero voltage level. The output of the zero crossing detector is applied to pin 3 of an integrated circuit U4A where it is divided by one half. Outputs from pins 5 and 16 of the integrated circuit U4A are applied to a 60 KHZ oscillator comprising an integrated circuit U2, resistors R7-R11, capacitors C5-C7 and an AND gate U3A. Outputs from pin 5 of the integrated circuit U4A are also applied to pin 12 of an integrated circuit U4B and to pin 3 of an integrated circuit U7A. These last mentioned integrated circuits perform further divisions; and outputs from the integrated circuits U4A, U4B and U7A are applied via AND gates U8A, U11A and U11B and OR gates U9A, U9B, U9C and U10C to the terminals D, E, F and G which supply, respectively, the signals for the noise gate, $\overline{\text{Strobe}}$, Strobe and clamp C.

The outputs from the 60 KHZ oscillator are also divided in the remaining integrated circuits, by four to produce the 15 KHZ phase A signals at the terminal A and the 15 KHZ phase B signals at the terminal B. Also the various circuits connected as shown produce the B Gate signals at the terminal C.

The outputs from the 60 KHZ oscillator are also further divided by six to produce 2.5 KHZ square wave signals at the output of a differential amplifier U19A. The output of this amplifier is converted to sine wave configuration by the circuit consisting of a coil L1 and parallel connected capacitors C13 and C14. These 2.5 KHZ sine wave signals are amplified in a first amplifier U19B and are further amplified in a second amplifier U20 before being applied to the series resonant circuit made up of the capacitor 36 and coil 38. As previously explained this causes the resonant circuit to resonate at 2.5 KHZ and induce alternating currents of high amplitude and at 2.5 KHZ in the transmitter antenna 10.

The value of the resistors, capacitors and other components and the type of integrated circuits used in the diagram of FIGS. 5A and 5B are given in the following table:

| TRANSMITTER AND SYNCHRONIZER COMPONENTS | | |
|---|---|---|
| Resistors (ohms) | | |
| R1-91K* | R9-1K | R17-9.1K |
| R2-12K | R10-10K | R18-130K |
| R3-12K | R11-1.1K | R19-180K |
| R4-1MEG** | R12-1.5K | R20-1K |
| R5-2.4K | R13-1.2K | R21-1K |
| R6-1430 | R14-3.0K | R22-560 |
| R7-1430 | R15-2.4K | R23-18K |
| R8-1K | R16-3.6K | R24-18K |

*K = 1000 ohms
**MEG = megohms

| Capacitors (microfarads) | | |
|---|---|---|
| C1-.03 | C7-0.002 | C13-910pf* |
| C2-.22 | C8-15/20 | C14-300-1200pf |
| C3-0.22 | C9-15/20 | C15-5.6 |
| C4-15/35 | C10-15/20 | C16-500pf |
| C5-15/20 | C11-15/20 | C17-47 |
| C6-0.005 | C12-15/35 | C18-4 |

*pf = picofarads
Integrated Circuits (these circuits and their equivalents are described, or identified by source, in the publications IC Master 1980 published by United Technical Publications Inc., 645 Stewart Avenue, Garden City, New York 11530).

| | | |
|---|---|---|
| U1-311 | U8-7408 | U15-74111 |
| U2-555 | U9-7402 | U16-74161 |
| U3-7400 | U10-7402 | U17-74111 |
| U4-7474 | U11-7400 | U18-75450 |
| U5-74540 | U12-74161 | U19-1458 |
| U6-7474 | U13-74161 | U20-HC2500 |
| U7-7474 | U14-74161 | |

| Other Components | |
|---|---|
| Transformer T1 - | conventional Triad Transformer |
| Control Rectifiers: | CR1 - 1N914 |
| | CR1A - 1N914 |
| | CR1B - 1N914 |
| Coil L1 - | 400 millihenries torroid |

As shown in the receiver diagrams of FIGS. 6A and 6B, alternating electromagnetic fields applied to the receiver antenna 12 cause it to produce bucking currents in its two loops. When those currents are unbalanced, alternating current is caused to flow in the coil 46 and is induced from there into the coil 50 of the parallel resonant circuit which also includes the capacitor 52. When this circuit, which is tuned to the 6th harmonic (e.g. 15 KHZ), resonates it applies a corresponding alternating voltage to the differential amplifier 56, which in FIG. 6A is shown as U21A. Outputs from this amplifier are passed by a filter comprising coils L2 and L3 and C20 and C21 which shunt unwanted harmonic frequencies, i.e. the fundamental (2.5 KHZ) and the fifth (12.5 KHZ). The remaining signal components are amplified and filtered in a series of integrated circuit filter amplifiers U22A, U23A, U24A, U24B and U21B and associated coil L4, capacitors C22, C23, C24, C25 and C26 and resistors R30-R40. In these filters all harmonic frequencies other than the sixth harmonic are shunted or attenuated while the sixth harmonic is amplified.

The sixth harmonic frequency signal from the amplifier U21B is supplied through an adjustable voltage divider resistor R41 to pins 3 and 11 of an integrated circuit synchronous detector U33. At the same time the 15 KHZ phase A signals from terminal A (FIG. 5B) are applied to pin 9 of the integrated circuit U33 and phase B signals from terminal B (FIG. 5B) are applied to pin 1. In addition, Strobe signals from terminal D (FIG. 5A) are applied to pins 8 and 16 of the integrated circuit U33.

The phase A synchronously detected signal from the integrated circuit U33 is taken from pin 10 and applied to an integrating amplifier comprising an integrated circuit amplifier U26B and associated resistors R45 and R46 and capacitor C29. The phase B synchronously detected signal is taken from pin 2 of U33 and applied to a second integrating amplifier comprising an integrated amplifier circuit U26A, resistors R42 and R43 and capacitor 27. The Strobe signals applied to pins 8 and 16 control the integration interval of the outputs phase A and phase B via pins 6 and 7 and 14 and 15 respectively to the integrating amplifier circuits.

The outputs of the integrating amplifier circuits are applied to full wave rectifiers CR8, CR9, CR10 and CR11 (FIG. 6B) and from there to integrated circuit differential amplifiers U27A and U27B. The outputs from these amplifiers are applied via control rectifiers CR12, CR13 and CR14 to pins 3 and 5 respectively of integrated circuit differential amplifiers U31A and U31B where the synchronously detected sixth harmonic signals are compared with detected third harmonic noise and nonsynchronously detected sixth harmonic signals. It will be noted that because of the timing of the application of the 15 KHZ phase A and phase B signals to the synchronous detector circuit U33 (FIG. 6A) this detector only detects sixth harmonic signals during the interrogation signal transmission from the transmitter antenna 10. As will be seen below, the detected third harmonic is also detected during the transmission intervals but the nonsynchronously detected sixth harmonic signals are detected only during the nontransmission intervals.

Reverting to FIG. 6A, it will be seen that signals from pin 3 of the filter amplifier U22A are applied to pin 5 of an integrated circuit amplifier U22B and from there through a further series of filter amplifiers comprising integrated circuit amplifiers U23B, U25A and U25B and associated resistors R48-R55, capacitors C29-C33 and coil L5. The output of this further series of filter amplifiers is the third harmonic of the transmission signal, namely 7.5 KHZ. This third harmonic signal is applied to pin 5 of an integrated circuit amplifier U28B whose output is applied via a control rectifier CR7 to pin 6 of an integrated circuit U34 (FIG. B).

At the same time, sixth harmonic signals, prior to synchronous detection, are applied from the output of the integrated circuit amplifier U21B (FIG. 6A) to pin 3 of an integrated circuit amplifier U28A. The output of this amplifier is applied via a control rectifier CR6 to pin 14 of the integrated circuit U34. In addition the noise gate signal from terminal D is applied to pin 16, the clamp C signal from terminal G is applied to pins 1 and 9 and the B gate signal from terminal C is applied to pin 8 of the integrated circuit U34. The noise gate signals operate during the nontransmission intervals to allow nonsynchronously detected sixth harmonic noise to pass through from pin 14 to pin 15. The B gate signals operate during the transmission intervals to allow third harmonic signals to pass through from pin 6 to pin 7. The noise outputs from pin 15 of the integrated circuit U34 are applied to an integrating amplifier circuit comprising an integrated circuit amplifier U29A, resistor R71, R72 and R74 and capacitor C35 connected to pins 10 and 11 of the integrated circuit U34. The third harmonic signal outputs from pin 7 of the integrated circuit 34 are applied to an integrating amplifier circuit comprising an integrated circuit amplifier U29B, resistors R73, R75 and R76 and capacitor C36 connected to pins 2 and 3 of the integrated circuit U34. The clamp signal applied to pins 1 and 9 controls the integration interval of the sixth and third harmonic integrating circuits.

The integrated sixth harmonic noise from the amplifier U29A is amplified in an amplifier U30A and passed through a control rectifier CR15 to pin 2 of the differential amplifier U31A. The integrated third harmonic signal from the amplifier U29B is amplified in an amplifier U30B and passed through a control rectifier CR16 to pin 6 of the differential amplifier U31B.

The differential amplifiers U31A and U31B compare the amplitudes of the synchronously detected and integrated sixth harmonic signal with the nonsynchronously detected but integrated sixth harmonic noise and the nonsynchronously detected but integrated third harmonic signal. The integration interval in each of the foregoing cases corresponds to two successive transmission bursts.

The outputs of the differential amplifiers U31A and U31B are combined in a signal combining circuit comprising resistors R87-R90, capacitor C37, control rectifier CR17 and an integrated circuit amplifier U32A. The outputs from this circuit is applied through a circuit comprising control rectifiers CR18, CR19, CR20 and resistor R91 to pin 2 of the first stage of a two successive pulse counting circuit comprising integrated circuits U37 and U38. Strobe signals from terminal F are applied to pins 3 and 11 of the integrated circuit U37 to clear the circuit if it does not receive consecutive pulses from consecutive transmission intervals.

The output of the two pulse counting circuits is applied via pin 3 of integrated circuit U38 to pin 11 of an integrated circuit U39 which controls the duration of alarm actuation. The outputs from the integrated circuit U39 are taken at pin 10 and applied via a two stage transistor amplifier comprising transistors Q1 and Q2 to an audio alarm SP1 and a visual alarm LA1. A control rectifier CR21 is also arranged in circuit with these alarms to disable them by operation of a switch SW1.

A novel feature of the present invention comprises a partial count disable circuit which responds to decreases in the detected third harmonic signal to prevent the accumulation of pulses from detected sixth harmonic signals. This novel feature comprises a differential amplifier U35 having its positive input connected to the pin 7 of full wave rectifier U40B, to receive the detected and integrated third harmonic signals, and its negative terminal connected to an adjustable voltage divider resistor R94. The output of the amplifier U35 is applied to the trigger input terminal of an integrated circuit U36. This circuit is a retriggerable one shot multivibrator and it is set for a duration of more than two but less than four successive transmission pulses. This is because the signal accumulators formed by the integrated circuit amplifiers U26A and U26B each build up charges over an interval of two successive transmission pulses to produce a pulse at the counter U37 and U38; and the counter itself accumulates two pulses before actuating the alarm. The output of the integrated circuit U36 is applied to pins 1 and 13 of the integrated circuit U37 to clear this circuit of any accumulated count.

The significance of the above described partial count disable circuit is that it prevents false detection of sixth harmonic signals when the level of the ambient third harmonic signals decreases. This has been found to happen when a large metal object first becomes coupled, electromagnetically, to the antennas or when it becomes decoupled. Thus, in spite of the fact that a large metal object, such as a shopping cart, causes the generation of large amplitude third harmonic signals, it also causes a decrease in those signals as it becomes coupled to and decoupled from the antennas. The partial count disable circuit senses these decreases and prevents the resulting relative increase in the size of any sixth harmonic signal from producing an accumulation of pulses in the counter U37 and U38. A decrease in the third harmonic causes the differential amplifier U35 to apply a trigger signal to the integrated circuit U36. This in turn applies a clear signal to the integrated circuit U37 for the duration of two successive transmission pulses. Thereafter, provided the third harmonic has returned to normal, or is higher, the integrated circuit U36 will revert to its normal state and permit pulses to be accumulated in the circuits U37 and U38.

The integrated circuits U40 and U41 perform "voltage follower" functions for the three synchronous detector input signals and also they accomplish the full wave rectification of the third harmonic channel for the disable circuit described hereinabove.

The values of the resistors, capacitors and other components and the types of integrated circuits used in the diagram of FIGS. 6A and 6B are given in the following table:

| RECIEVER COMPONENTS | | |
|---|---|---|
| Resistors (ohms) | | |
| R25-10K* | R35-2.7K | R45-2.7K |
| R26-10K | R36-6.2K | R46-1K |
| R27-10K | R37-33K | R47-30K |
| R27'-2K | R38-10K | R48-8.2K |
| R28-10K | R39-7.5K | R49-820 |
| R30-11K | R40-390K | R50-3.3K |
| R31-2.2K | R41-10K | R51-20K |
| R32-4.7K | R42-1K | R52-5.6K |
| R33-22K | R43-2.7K | R53-2.2K |
| R34-7.5K | R44-30K | R54-4.7K |
| R55-24K | R65-10K | R75-1K |
| R56-5.1K | R66-10K | R76-10K |
| R57-10K | R67-10K | R77-10K |
| R58-10K | R68-10K | R78-7.5K |
| R59-10K | R69-10K | R79-10K |
| R60-10K | R70-10K | R80-7.5K |
| R61-10K | R71-1.1K | R81-30K |
| R62-10K | R72-10K | R82-30K |
| R63-10K | R73-1.1K | R83-10K |
| | R74-1K | R84-10K |
| | | R85-10K  R95-1K |
| | | R86-10K  R96-1K |

-continued

RECIEVER COMPONENTS

| | |
|---|---|
| R87-10K | R97-2K |
| R88-10K | R98-200K |
| R89-10K | R99-10K |
| R90-10K | R100-1K |
| R91-24K | R101-10K |
| R92-2.4K | R102-10K |
| R93-5.1K | R103-10K |
| | R104-10K |

*K = 1000 ohms

Capacitors (microfarads)

| | |
|---|---|
| C20-0.4 | C30-0.0068 |
| C21-800–1970 pf | C31-0.0068 |
| C22-800–1970 pf | C32-0.0068 |
| C23-0.002 | C33-0.0068 |
| C24-0.002 | C34-0.1 |
| C25-0.002 | C35-1 |
| C26-0.002 | C36-1 |
| C27-1 | C37-0.002 |
| C28-1 | C38-0.01 |
| C29-800–1970 pf | C39-47 |

Coils (henries)

L2-0.1
L3-0.1
L4-0.1
L5-0.1

Integrated Circuits (these circuits or their equivalents are described or identified by source in the publication IC Master 1980).

| | |
|---|---|
| U1-U32 | - 1458 linear operational amplifier |
| U33 | - DG201 quad SPST switch |
| U34 | - DG201 quad SPST switch |
| U36 | - MC14538 dual monostable multivibrator |
| U37 | - 7474 dual D flip flop |
| U38 | - 75452 dual peripheral NAND driver |
| U39 | - 14528 dual monostable retriggerable multivibrator |
| U40 | - 1458 linear operational amplifier |
| U41 | - 1458 linear operational amplifier |
| Cr2-CR20 | - 1N4148 |

Transistors

Q1 - 2N2219
Q2 - MJE1090

Figure 7:
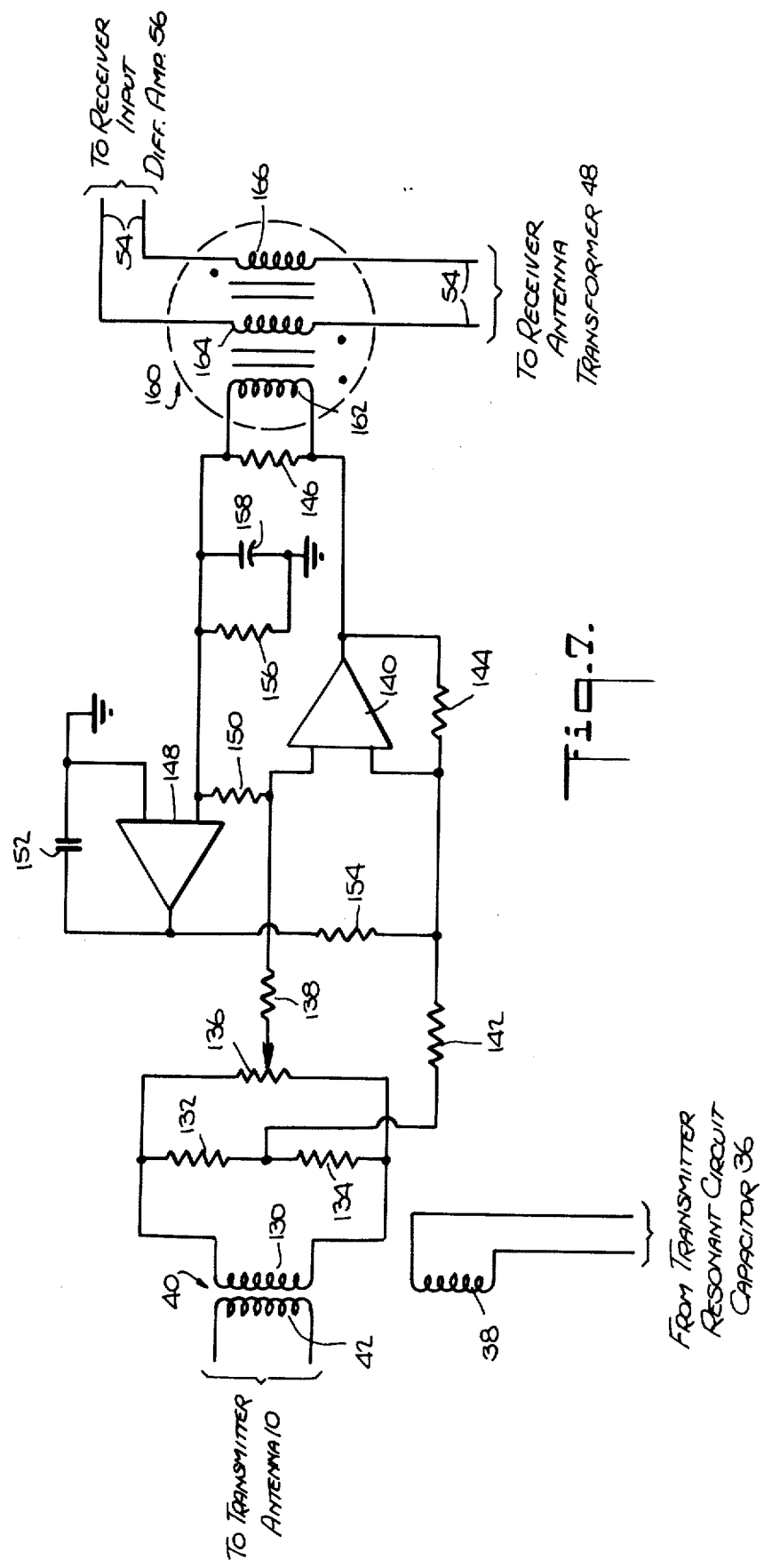
FIG. 7 is a circuit diagram showing an electronic balancing circuit for use with the apparatus of FIG. 1.

FIG. 7 shows a circuit for electronically balancing the receiver antenna so that it will balance and cancel out currents in each loop which are received from the transmitter antenna 10 even though the receiver and transmitter antennas may not be in precise physical alignment. The circuit of FIG. 7 includes a ten turn balance circuit input winding 130 wrapped on the transmitter transformer 40. The ends of this winding are connected to the ends of two 510 ohm voltage divider resistors 132 and 134 connected in series. The ends of these resistors are also connected across a one megohm potentiometer resistor 136. A tap on this resistor is connected via a twenty kilohm resistor 138 to input of a first 741 type operational amplifier 140. The second input of this operational amplifier is applied from between the voltage divider resistors 132 and 134 through a further twenty kilohm resistor 142. A further twenty kilohm resistor 144 is used to feed back the output from the operational amplifier 140 to its second input.

The output of the first operational amplifier 140 is applied via a ten kilohm resistor 146 to an input of a second 741 type operational amplifier 148. This last mentioned input is also connected to the one input of the first operational amplifier 140 via a ten kilohm resistor 150. The second input of the second operational amplifier 148 is connected to ground and its output is also coupled to ground via a one microfarad capacitor 152. The output of the second operational amplifier 148 is also connected via a resistor 154 to the second input of the first operational amplifier 140. A twenty kilohm resistor 156 and a twenty microfarad capacitor 158 are also connected in parallel between the first input of the second operational amplifier 148 and ground.

A toroid core transformer 160 has an input winding 162 connected across the resistor 146. The transformer 160 has two secondary windings 164 and 166 arranged in mutual phase opposition and these are each connected in series along the lines 54 (FIG. 1) between the resonant circuit capacitor 52 and the differential amplifier 56.

By adjusting the potentiometer resistor 136 the level of the 2.5 KHZ signal applied to the input winding 162 of the torroid core transformer is controlled. This changes the relative magnitudes of the 2.5 KHZ signals received from the two sides of the receiver antenna. It will be appreciated that by proper adjustment of the potentiometer resistor 136 it is possible to electronically balance out any unbalance that may exist either due to positioning or construction of the receiver antenna.

Having thus described the invention with particular reference to the preferred forms thereof, it will be obvious to those skilled in the art to which the invention pertains, after understanding the invention, that various changes and modifications may be made therein without departing from the spirit and scope of the invention as defined by the claims appended hereto.

What is claimed and desired to be secured by Letters Patent is:

1. Article theft detection apparatus for signalling the passage of protected articles from a protected area through an interrogation zone, said articles having targets mounted on them in the form of thin elongated strips of easily saturable magnetic material which, when subjected to an alternating magnetic interrogation field in said zone, become repeatedly saturated and produce alternating magnetic response fields at frequencies which are harmonics of the frequency of said interrogation field, said article theft detection apparatus comprising transmitter and receiving antennas positioned across from each other on opposite sides of said interrogation zone, said transmitter antenna being formed of a single turn loop of a high electrical conductivity material, a transmitter connected to drive alternating electrical current in said loop to cause it to generate said alternating magnetic interrogation field in said zone, said receiver antenna being formed of a single turn rectangular outer loop of high electrical conductivity rigid metal pipe having its longer dimension vertical and bisected by a length of high electrical conductivity rigid metal pipe extending vertically along the center of said rectangular loop to form two bucking loops, a receiver connected to receive and detect altrnating currents at a selected one of said harmonic frequencies which flow more heavily in one bucking loop than the other and an alarm connected to operate in response to the reception and detection of said alternating currents by said receiver.

2. Article theft detection apparatus according to claim 1 wherein said transmitter and receiver antennas lie in parallel planes and are in alignment with each other.

3. Article theft detection apparatus according to claim 2 wherein said transmitter and receiver antennas have substantially the same outer size and configuration.

4. Article theft detection apparatus according to claim 1 wherein said transmitter and receiver antennas are each substantially purely inductive and are each coupled inductively to a resonant electrical circuit.

5. Article theft detection apparatus according to claim 4 wherein the resonant electrical circuit coupled inductively to said transmitter antenna is a series connected circuit.

6. Article theft detection apparatus according to claim 4 or 5 wherein the resonant electrical circuit coupled inductively to said receiver antenna is a parallel connected circuit.

7. Article theft detection apparatus according to claim 1 wherein said receiver is constructed to receive and detect alternating currents at the sixth harmonic frequency.

8. Article theft detection apparatus according to claim 1 wherein a gap is formed in said rigid metal pipe extending vertically along the center of said rectangular loop and wherein said receiver has its input connected across said gap.

9. Article theft detection apparatus for signalling the passage of protected articles from a protected area through an interrogation zone, said articles having targets mounted on them in the form of thin elongated strips of easily saturable magnetic material which, when subjected to an alternating magnetic interrogation field in said zone, become repeatedly saturated and produce alternating magnetic response fields at frequencies which are harmonics of the frequency of said interrogation field, said article theft detection apparatus comprising transmitter and receiver antennas positioned across from each other on opposite sides of said interrogation zone, said transmitter antenna being formed of a single turn loop of a high electrical conductivity material and being substantially purely inductive, a transmitter connected to drive alternating electrical current in said loop to cause it to generate said alternating magnetic interrogation field in said zone, said transmitter comprising a source of alternating electical signals, and amplifier connected to receive signals from said source and to amplify same, a series resonant circuit comprising a capacitor and a first coil connected in series between the output of said amplifier and ground, said series resonant circuit being tuned to resonance at the frequency of said alternating electrical signals, a second coil having substantial less turns than said first coil and being inductively coupled to said first coil as a transformer secondary winding, the ends of said said second coil being directly connected to the ends of the single turns loop of said transmitter antenna, a receiver connected to receive and detect alternating currents which flow in said receiver antenna at a selected one of said harmonic frequencies and an alarm connected to operate in response to the reception and detection of said alternating currents by said receiver.

10. Article theft detection apparatus according to claim 9 wherein said transmitter antenna is formed of rigid metal pipe.

11. Article theft detection apparatus according to claim 9 wherein said transmitter antenna is formed in generally rectangular configuration with its longer sides vertical.

12. Article theft detection apparatus according to claim 10, or 11, wherein said single turn loop is formed with a gap in the lower portion thereof and wherein said second coil is connected across said gap.

13. Article theft detection apparatus for signalling the passage of projected articles from a protected area through an interrogation zone, said articles having targets mounted on them in the form of thin elongated strips of easily saturable magnetic material which, when subjected to an alternating magnetic interrogation field in said zone, become repeatedly saturated and produce alternating magnetic response fields at frequencies which are harmonics of the frequency of said interrogation field, said article theft detection apparatus comprising transmitter and receiver antennas positioned across from each other on opposite sides of said interrogation zone, a transmitter connected to drive alternating electrical current in said transmitter antenna to cause it to generate said alternating magnetic interrogation field in said zone, said receiver antenna being formed of a loop of high electrical conductivity material, said receiver antenna being substantially purely inductive, a coil and a capacitor connected in parallel to form a resonant circuit at a selected one of said harmonic frequencies, said receiver antenna being inductively coupled to said coil and a receiver connected across said capacitor for generating an alarm in response to the occurrence of a resonance condition in said resonant circuit said receiver antenna being in the form of a substantially rectangular outer loop with its longer sides vertical and bisected by a vertical conductor length extending between its upper and lower ends to form a pair of bucking loops.

14. Article theft detection apparatus according to claim 13 wherein said receiver antenna is formed of rigid metal pipe.

15. Article theft detection apparatus according to claim 14 wherein said receiver antenna has substantially the same outer configuration and size as said transmitter antenna.

16. Article theft detection apparatus according to claim 13 wherein the length of conductor which bisects said outer loop is connected to said outer loop at one end and forms a gap with said outer loop near its other end and wherein a transformer coil is connected across said gap.

17. Article theft detection apparatus according to claim 16 wherein said transformer coil forms the primary of transformer, the secondary of which is the coil of said resonant circuit.

18. Article theft detection apparatus according to claim 17 wherein the secondary of said transformer has a substantially greater number of turns than said primary.

19. Article theft detection apparatus for signalling the passage of protected articles through a supermarket aisleway alongside a checkout counter, said articles having targets mounted on them in the form of thin elongated strips of easily saturable magnetic material which, when subjected to an alternating magnetic interrogation field in an interrogation zone along said aisleway become repeatedly saturated and produce alternating magnetic response fields at frequencies which are harmonics of the frequency of said interrogation field, said article theft detection apparatus comprising transmitter and receiver antennas positioned across from each other on opposite sides of said interrogation zone, said antennas being spaced apart a distance to to permit a shopping cart in said supermarket to pass between them, a transmitter connected to energize said transmitter antenna to generate a magnetic interrogation field in said interrogation zone at a predetermined fundamental frequency, a receiver connected to said receiver antenna to select alternating currents at a particular higher harmonic and at a particular lower harmonic of said fundamental frequency which flow in said receiver antenna, said receiver including an alarm operative in response to the presence of receiver antenna current at said particular higher harmonic, and further including a circuit for disabling operation of said alarm in response to the occurence of receiver antenna current at said particular lower harmonic and greater than a predetermined magnitude relative to the magnitude of the receiver antenna current at said particular higher harmonic, and said receiver also including a second disable circuit responsive to a decrease in the magnitude of the receiver antenna current at said particular lower harmonic to further disable operation of said alarm at least during the interval in which said decrease is present.

20. Article theft detection apparatus according to claim 19 wherein said apparatus is constructed to produce a series of signals in response to the presence of a target in said interrogation zone, said receiver including an accumulator for accumulating said signals and for operating said alarm upon a predetermined accumulation and wherein said second disable circuit comprises a signal level monitor connected to monitor signals corresponding to the magnitude of the receiver antenna current at the particular lower harmonic and to produce a disable signal in response to the monitoring of a decreased amplitude at said particular lower harmonic and a further connection arranged to clear said accumulator in response to said disable signal.

21. Article theft detection apparatus according to claim 20 wherein said accumulator is a counter.

22. Article theft detection apparatus according to claim 21 wherein said signal level monitor monitors the level of the receiver antenna current at the particular lower harmonics at predetermined intervals and wherein said further connection includes a monostable circuit connected to be triggered by the output of said signal level monitor, the output of said monostable circuit being connected to clear said counter, said monostable circuit having a triggered output duration greater than said predetermined interval.

23. Article theft detection apparatus according to claim 22 wherein said triggered output duration is less than two of said predetermined intervals.

24. Article theft detection apparatus according to claim 23 wherein said transmitter transmits periodically during spaced apart time intervals and wherein said triggered output duration is greater than the time required for the transmission of two successive transmitter pulses but less than the time required for the transmission of four successive transmitter pulses.

25. Article theft detection apparatus for signalling the passage of protected articles through a supermarket aisleway alongside a checkout counter, said articles having targets mounted on them in the form of thin elongated strips of easily saturable magnetic material which, when subjected to an alternating magnetic interrogation field in an interrogation zone in said aisleway become repeatedly saturated and produce alternating magnetic response fields at frequencies which are harmonics of said interrogation field, said article theft detection apparatus comprising transmitter and receiver antennas positioned across from each other on opposite sides of said interrogation zone, said transmitter antenna being formed of a single loop and said receiver antenna being formed of coplanar bucking loops, said antennas being spaced apart a distance to permit a shopping cart in said supermarket to pass between them, the receiver antenna having a total width, in a direction along said aisleway, less than the length of such supermarket shopping cart, a transmitter connected to energize said transmitter antenna to generate a magnetic interrogation field in said interrogation zone at a predetermined fundamental frequency, a receiver connected to said receiver antenna to selected unbalanced alternating currents at a particular higher harmonic and at a particular lower harmonic of said fundamental frequency which flow more heavily in one bucking loop than the other, said receiver including an alarm operative in response to unbalanced antenna current at said particular higher harmonic and further including a disabling circuit for disabling operation of said alarm in response to unbalanced antenna current at said particular lower harmonic and greater than a predetermined magnitude relative to the magnitude of the current at said particular higher harmonic.

26. Article theft detection apparatus according to claim 25 wherein the receiver antenna loops each have a width, in the direction of passage along the aisleway, of about one foot.

27. Article theft detection apparatus according to claim 25 wherein the transmitter antenna has the same external size and configuration as the receiver antenna.

28. Article theft detection apparatus according to claim 25 wherein said transmitter and receiver antennas are of generally rectangular outer configuration with their longer sides vertical.

29. Article theft detection apparatus according to claim 25, 26, 27 or 28 wherein said receiver antenna is bisected into two loops by a centrally located vertical conductor extending from the upper to the lower portions thereof.

* * * * *